Nov. 18, 1930.  W. H. NOELTING  1,781,732
DETACHABLE TOP BEARING CASTER AND SOCKET
Filed April 15, 1927
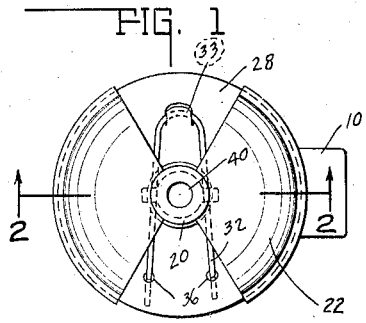
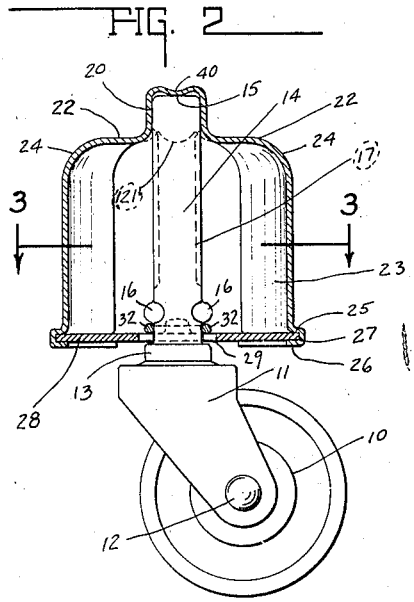
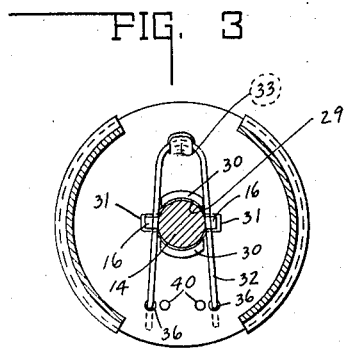
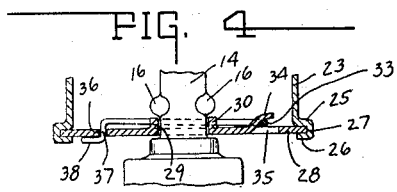
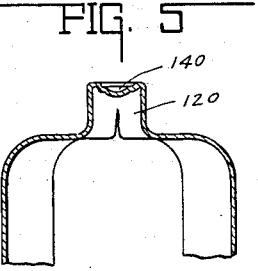
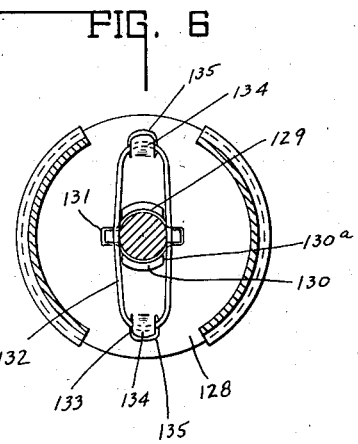
INVENTOR.
WILLIAM H. NOELTING.
BY
Goldsmith & Salt
ATTORNEYS.

Patented Nov. 18, 1930

1,781,732

UNITED STATES PATENT OFFICE

WILLIAM H. NOELTING, OF EVANSVILLE, INDIANA, ASSIGNOR TO FAULTLESS CASTER COMPANY, OF EVANSVILLE, INDIANA, A CORPORATION

DETACHABLE TOP-BEARING CASTER AND SOCKET

Application filed April 15, 1927. Serial No. 183,987.

This invention relates to a detachable top bearing caster construction.

The chief object of this invention is to provide a top bearing caster for tubular legs or the like which permits of ready detachment between the caster and the socket.

The several features of the invention consist in the centrally apertured and eccentrically recessed plate, the pintle fashioned for detachable anchorage by a relatively simple operation and the top bearing cup to receive the end of the pintle for laterally confining the same and sustaining the load.

This invention is an improvement upon the caster shown in the Noelting Patent No. 626,439 since that caster, when subjected to a side strain or bump through the movement of the load over an obstruction such as a door sill or the like, permits the separation of the spring ears and thus allows the caster to drop out of the socket. Also when the sides were formed for mutual abutment they constituted a partial obstruction to the seating of the socket in the tubular opening of the load or tubular leg and thus considerable effort would be required to seat the aforesaid patented structure in the tubular opening of the load. This was annoying to the users of the socket. Other minor objections could be mentioned relative to this construction, which objections have been substantially eliminated by the present invention.

The full nature of the invention will be understood from the accompanying drawings and the following description and claims:

In the drawings Fig. 1 is a top plan view of the invention. Fig. 2 is a vertical sectional view taken on the line 2—2 of Fig. 1 and in the direction of the arrows. Fig. 3 is a transverse sectional view taken on line 3—3 of Fig. 2 and in the direction of the arrows. Fig. 4 is a vertical sectional view similar to a portion of Fig. 2 but with the socket translated 90 degrees. Fig. 5 is a central sectional view of a modified form top bearing. Fig. 6 is a transverse sectional view of a modified form of pintle retainer.

In the drawings 10 indicates the caster wheel supported in a yoke 11 by a pin 12. The yoke is carried by a stem having the enlargement 13 and extending upwardly therefrom is the socket receivable portion 14 terminating in a head 15. Herein the stem is shown as being of substantially the same diameter throughout its length and is also shown provided with a substantially flat head portion or end. Immediately adjacent the enlargement 13 the stem is struck or pinched to provide the diametrically positioned projections 16 or ears. A single operation on the stem provides these ears and the material is drawn from the stock of the stem immediately adjacent thereto as shown. If desired, the head of the stem may be shown rounded as illustrated in the Noelting Patent No. 626,439. Also, if desired the stem may be reduced intermediate its ends as indicated by the dotted lines 17 or a smaller wire may be enlarged accordingly. The end 15 of the stem instead of being substantially square, may be spherical or the head may be dished in a reverse direction.

The socket for detachably receiving the caster stem and retaining the same comprises a drawn cup 20 which may or may not be provided with the short lips 121, as desired. Extending diametrically oppositely from the cup in spaced relation with the tongues 121 are the lateral portions 22 of the socket and these are substantially segmental in outline. Each terminates in a barrel forming member 23, the same being connected together by a relatively short radius curved portion 24. The lower end of the barrel portion 23, which is partially substantially cylindrical in its formation, extends laterally and outwardly as at 25 and is then turned inwardly at 26 to form a groove 27 therebetween which is arcuate to receive and clampingly engage the periphery of a load supporting plate 28. Plate 28 is provided with a central aperture 29 and herein said aperture may be defined by a flange or boss 30 which extends upwardly a slight distance above the plate, the purpose of the same being set forth hereinafter. The central aperture 29 is adapted to receive the stem 14. Extending diametrically from said central aperture and into the plate are the recesses 31 so fashioned as to permit passage of the wings or ears 16 therethrough when the stem is inserted in the socket.

The means for detachably retaining the socket comprises a spring or yielding construction and herein the same is shown carried by the plate. A substantially U-shaped spring wire or hairpin 32 has its mid-portion 33 receivable by an angularly positioned tongue 34 struck up from the plate 28 at 35 and constituting an anchorage for one end of the yielding retainer. The plate is provided with the apertures or holes 36 substantially opposite from the tongue 34 and each end of the spring 32 has an angular extension 37 that extends through an opening 36 and the free end of said extending portion 37 is turned angularly as at 38. The foregoing anchors the spring to the plate, and as shown in Fig. 3, the flange 30 is cut away so that the spring wire 32 lies substantially tangential to the central aperture 29.

When the stem 14 is passed through the central openings 29 the ears 16 pass through the recesses 31 in the plate and in passing therethrough since said ears are substantially arcuate in outline, they cam the spring wire 32 outwardly from the aperture and thus the ears pass upwardly through the plate and rest above the spring. To permit free swiveling of the pintle or stem 14 the flange portions 30 terminate substantially in the same plane as the upper plane including the yielding retainer or hairpin construction so that the stem will ride or swivel freely in substantially the same plane in its swiveling action when the load is released from the several parts. Were it not for this construction the initial swiveling movement would carry the ears laterally until they rested upon plate 28 and any additional movement thereupon would cause the ears 16 to engage the inside of the spring wire and cam the same out of registration with the recesses. As soon as the wires were thus cammed out of registration with the recesses the caster would be released from the socket. The present construction, as stated, permits free swiveling of the caster relative to the socket upon release of load without the escapement of the stem from the socket. To detach the stem from the socket positive or forceful axial pull is required upon the stem when the ears are positioned immediately above the recesses. Then the lower surface of the arcuate portion of the ears engages the spring wire and cams the same laterally out of registration with the recesses and permits the removal of the caster stem.

The socket portion formed as hereinbefore indicated, provides a substantially full line load contact off the partial cylinders 23 from the plate 28 to the transverse segmental portions 22 with the interior of the tubular opening receiving the socket. While substantially complete cylindrical contact is not obtained by reason of the partial substantially cylindrical formation of the spring frame portions 23, actually greater total contact is obtained therewith upon the wall of the tubular opening for receiving the same than is possible with the construction shown in the before mentioned patent and other constructions heretofore employed.

The drawn cup may be provided in its head portion 40 with a depression that is convex to the interior of said cup and thus adapted to form a relatively frictionless top bearing constriction with a square headed stem. The drawn cup, by reason of its depth, provides substantially lateral confinement since it receives the stem for a considerable distance from the end thereof. Thus, side play or lateral cocking of the stem is substantially eliminated in this type of caster. It is to be noted that there is slight clearance between the lower ends of the ears 16 and the plane of the end of the flange 30 so that under load the ears 16 will ride free of the wire spring 32 or yielding retainer and the flange portions 30.

If the holes 36 are so positioned that the portions 32 of the yielding retainer are substantially tangential to the central aperture, then the lateral displacement of said members is caused by the engagement therewith of the enlargement 16 carried by the stem in the attaching and detaching of the caster from the socket. The holes 40 in the plate, therefore, are provided when it is desired to have the members 32 laterally engage the stem at all times while the stem is in the socket. It will also be apparent that in either event, by reason of the termination of the flange 30 lying in a plane coincident with the top of the yielding member 32, that the projections 16 will swivel freely on said flange and the retaining member without any relative axial movement of the stem until forcible detachament is desired.

In Fig. 5 a modified form of drawn socket is shown. Herein the bearing 140 may be multiple in character similar to Patent No. 626,439 and instead of being drawn entirely, the cup 120 may be drawn part way and folded the remainder of distance with the parts seamed together or otherwise secured if desired.

In Fig. 6 a modified form of pintle retainer is illustrated. Plate 128 has the central aperture 129 defined by collar 130 relieved or cut away at 130ª. The plate includes slot 131 and a pair of diametrically positioned tongues 134 formed by punching the plate at 135 and securing the smaller end 133 of a closed link 132 of spring wire.

The invention claimed is:

1. A detachable caster and socket combination comprising a caster stem having a plurality of laterally extending rigid enlargements near the bottom thereof, said enlargements being arranged in spaced relation to each other and lying in substantially the same plane transverse to the stem axis, a centrally apertured plate for receiving said stem and including a plurality of recess extensions communicating therewith, each of slightly larger dimension than and of similar outline to the stem enlargement and arranged in similarly spaced relation for the simultaneous passage of the enlargements therethrough for stem mounting and detachment, yielding means positioned adjacent all of the recesses and normally in registration therewith for engaging the enlargements for retaining said stem in the plate when the stem is not under load, said yielding means being movable out of registration with the recesses upon forcible entry or removal of the stem when the enlargements thereof are in registration with said recess extensions.

2. A detachable caster and socket combination comprising a caster stem having a plurality of laterally extending rigid enlargements near the bottom thereof, said enlargements being arranged in spaced relation to each other and lying in substantially the same plane transverse to the stem axis, a centrally apertured plate for receiving said stem and including a plurality of recess extensions communicating therewith, each of slightly larger dimension than and of similar outline to the stem enlargement and arranged in similarly spaced relation for the simultaneous passage of the enlargements therethrough for stem mounting and detachment, yielding means positioned adjacent all of the recesses and normally in registration therewith for engaging the enlargements for retaining said stem in the plate when the stem is not under load, said yielding means being movable out of registration with the recesses upon forcible entry or removal of the stem when the enlargements thereof are in registration with said recess extensions, two of the enlargements being diametrically positioned and two of the recesses being similarly positioned, said yielding means engagement being associated with diametrical sides of the stem, and comprising a U-shaped stem straddling member carried by said plate.

3. A detachable top bearing caster for a tubular leg including a caster stem and a socket detachably associated therewith comprising a centrally apertured leg supporting plate for receiving the stem, spring frame means including a deep cylindrical closed end cup forming a top bearing for receiving and laterally confining the stem at all times when associated with the socket and engageable by the end of the stem when under load, a plurality of substantially segmental horizontally positioned cup-centering and supporting portions integral therewith and extending radially therefrom in spaced relation and substantially into leg engagement, an elongated arcuately sectioned and partially cylindrical load engaging portion at one end integral with each segmental portion at the leg engageable portion and having partial cylindrical contact with the leg interior and an interlocking connection at the opposite end with the plate adjacent the periphery thereof, and means carried by the plate for yieldingly engaging the stem for yieldingly retaining the same in the socket when not under load but permitting forcible separation when desired, said means normally sustaining none of the load and being free from operative engagement with the stem when the stem is loaded for free swivelling of the latter.

In witness whereof, I have hereunto affixed my signature.

WILLIAM H. NOELTING.